H. Z. FLETCHER.
GATE.
APPLICATION FILED OCT. 19, 1914.
1,188,261.
Patented June 20, 1916.
2 SHEETS—SHEET 1.
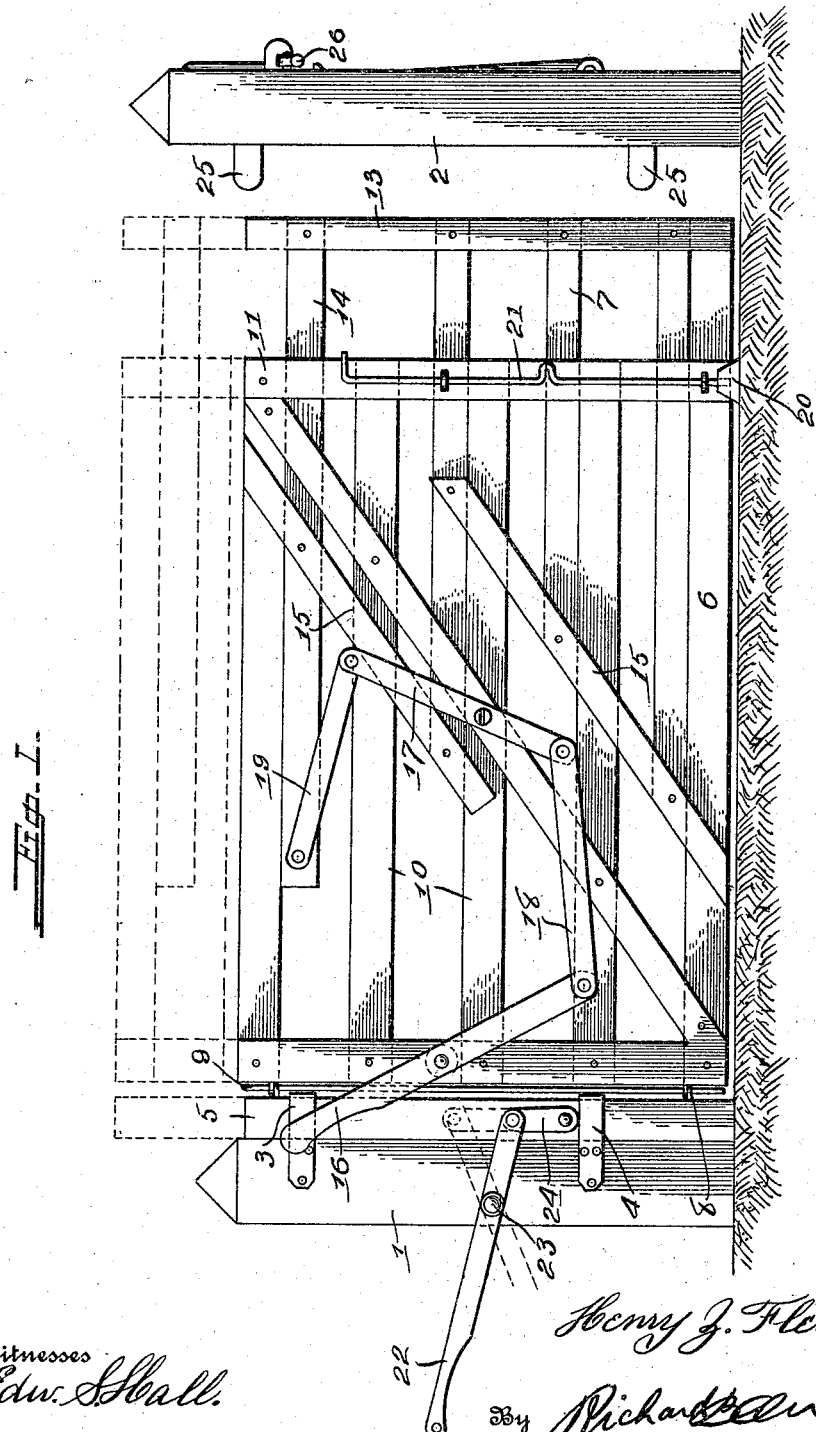
Witnesses
Edw. S. Hall.
Lloyd W. Patch
Inventor
Henry Z. Fletcher.
By Richard B. Owen,
Attorney

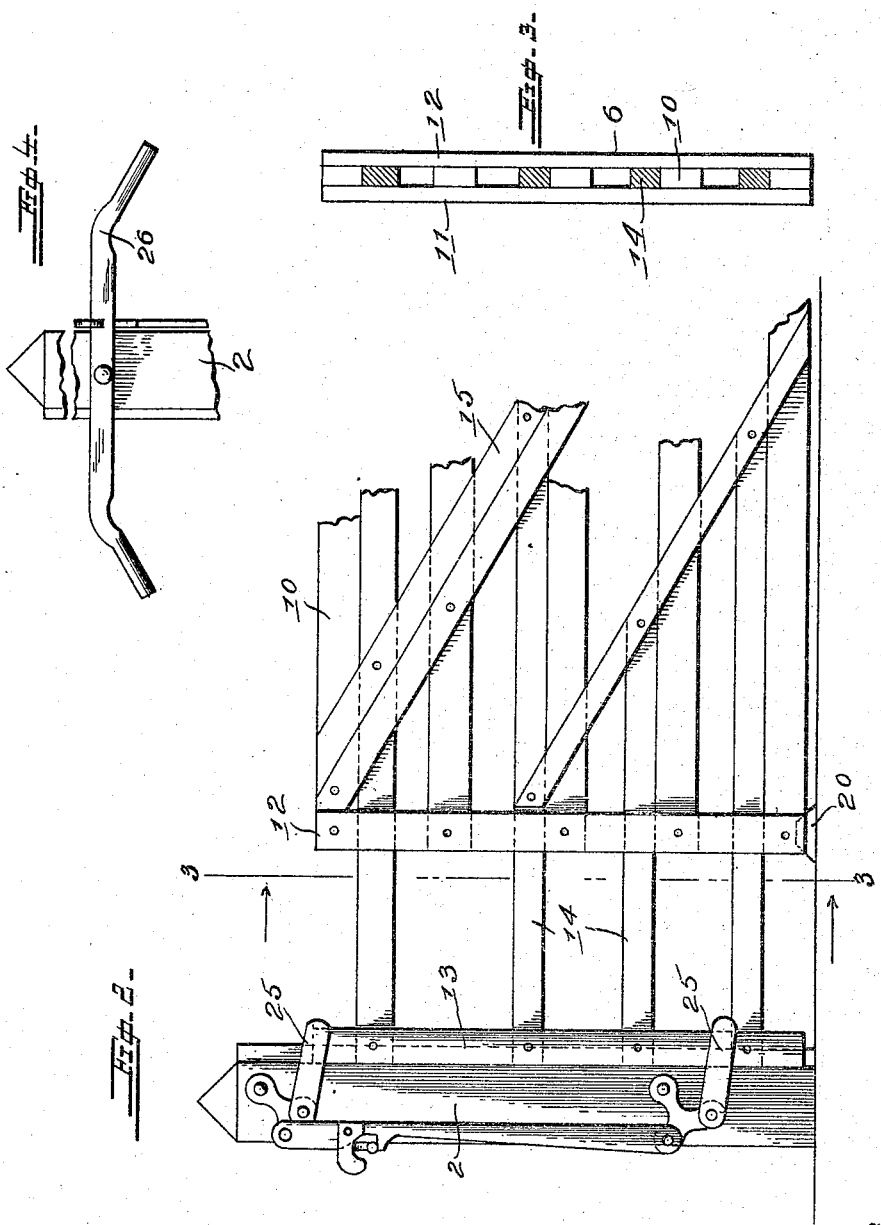

UNITED STATES PATENT OFFICE.

HENRY Z. FLETCHER, OF SEYMOUR, INDIANA.

GATE.

1,188,261.  Specification of Letters Patent.  Patented June 20, 1916.

Application filed October 19, 1914. Serial No. 867,475.

*To all whom it may concern:*

Be it known that I, HENRY Z. FLETCHER, a citizen of the United States, residing at Seymour, in the county of Jackson and State of Indiana, have invented certain new and useful Improvements in Gates, of which the following is a specification.

An object of my invention is to provide a gate which may be used in separating the larger stock such as horses, cows and etc.

A further object is to so construct the gate and the mounting therefor that the clearance of the gate above the ground may be adjusted and varied and the gate can thus be adapted for use in grading hogs, shoats, etc., by being raised to a height above the ground to permit the passage of animals of a certain size.

A still further object is to construct a gate which while permitting adjustment and operation as hereinbefore set forth is useful and highly efficient as an ordinary farm gate.

With other objects in view, which will be referred to, my invention consists in the peculiar combination and novel arrangement of parts, such as will be hereinafter more fully described in connection with the accompanying drawings and more particularly pointed out in the appended claims.

In the drawings:—Figure 1 is a view in elevation of the structure of my invention with one of the adjusted positions thereof indicated in dotted line. Fig. 2 is a fragmentary view in elevation of the swinging end of the gate taken from the reverse side of the disclosure in Fig. 1. Fig. 3 is a transverse vertical sectional view taken on the line 3—3 of Fig. 2 and looking in the direction of the arrow. Fig. 4 is a detail view of the latch-operating lever.

The gate posts 1 and 2 may be the posts by which the ends of the fence adjacent the gate are held or may be posts set purposely to provide a mounting or support for the gate.

The straps or loops 3 and 4 are secured on the posts 1 near the upper and lower end thereof placed above the ground and the jamb member 5 is fitted in these strap members to have endwise movement in a vertical direction as is indicated by the dotted lines in Fig. 1, this jamb member 5 being adapted to normally rest in the position shown in full line in this figure and to thus provide a support for the gate.

The gate comprises the member 6 adapted to be swung on the jamb 5 and a member 7 which is mounted on and supported by the member 6 to be capable of endwise sliding movement with respect thereto. The jamb member 5 and the member 6 of the gate each have the eyelets 8 connected along the adjacent edges thereof and a hinge pin 9 is inserted through the eyelets of the two members to swing the gate member 6 on the jamb member 5.

The gate member 6 comprises a plurality of longitudinally disposed slats 10 and the upright members 11 and 12 are secured on each side of these slats at the outer ends of the gate member to provide slot openings therethrough as better illustrated in Fig. 3. The member 7 of the gate comprises the end stile 13 with a horizontally disposed slat 14 connected therewith to fit through the openings provided between the vertically disposed members 11 and 12 of the gate member 6 and bear against the slots 10, and the diagonal brace members 15 are secured across the several slat members 14 of the gate member 7 after these slat members have been fitted in the relation disclosed in the several figures of the drawings where the gate member 7 is mounted on the gate member 6 to have endwise sliding movement with respect thereto.

A hand lever 16 is pivoted near its center on the gate member 6 and the rocking lever 17 pivoted in a like manner on the member 6 has one of the ends thereof connected with the free end of the hand lever 16 by a link 18 so that as the hand lever is rocked around its point of pivotal connection, a similar swinging movement is transmitted to the rocking lever 17. A link 19 is connected with the free end of the rocking lever 17 and at its opposite end has a pivotal connection on one of the slats 14 of the gate member 7 so that as the hand lever 16 is swung in the one direction or the other, the head stile 13 of the gate member 7 will be extended from and contracted toward the members 11 and 12 of the gate member 6 accordingly as the hand lever 16 may be swung in opposite directions.

A socket member 20 is secured on the ground in the swinging path of the head members 11 and 12 of the gate member 6 and a locking bolt 21 is mounted to have endwise sliding movement in suitable bearings on the member 11 and to be brought to a position to engage in the socket 20 and to thus hold the member 6 against swinging movement around the hinge pin 9. As a means of adjusting the height at which the gate swings above the ground level, an operating lever 22 is pivoted at 23 on the post 1 and a toggle 24 is connected with the free end of this operating lever 22 and has a pivotal connection with the jamb member 5 so that as the operating lever is swung around its pivotal connection at 23 the jamb member 5 will be raised and through the hinging of the gate member 6 with this jamb member 5 the parts will all be raised to the position indicated in the relation indicated in dotted line in Fig 1.

As a means of securing the gate in its closed position when the locking bolt 21 is not in use, the stops or latch members 25 are provided to be hinged on the gate posts 2 and are operated through the hand lever 26 which is pivoted to the post 2 and extends on either side thereof to permit manual operation of the member 25 from either side of the gate, and while one specific form of latch or lock has been here illustrated, it will be understood that this structure might be varied and yet come within the scope of this invention.

When the gate is to be used as an ordinary farm gate, the hand lever 16 will be adjusted to the proper position to cause the head stile 13 to close adjacent the post 2 and the operating lever 22 will remain in the position indicated in full lines in Fig. 1 where the gate is permitted free swinging movement, but when it is desired to use the gate in separating out stock of the larger animals such as horses and cattle, the locking bolt 21 will be engaged at its lower end in the socket 20 and this will hold the gate member 6 against swinging movement around the hinge pin 9, then by operating the hand lever 16 the gate member 7 may be extended from or withdrawn toward the head end of the gate member 6 and certain of the animals can be permitted to pass through the opening provided between the head stile 13 in its retracted position and the gate post 2, other animals being cut out as they approach the passage thus provided. To adapt the gate to be used in grading the smaller stock as hogs, sheep, etc., the member 7 will be extended to have the head stile thereof abut against the gate post 2, then by shifting the operating lever 22 around the pivotal connection at 23 thereof, the jamb member 5 will be raised to the desired height above the ground and all animals under a given size will be permitted to pass beneath the gate, animals of a greater size being excluded from this passage.

From the foregoing it will be seen that I have provided a gate which is simple and efficient in construction and operation and which in addition to its use as a closure in a fence opening may be, with slight adjustment adapted for use in separating out and in grading stock.

While I have herein shown and described one specific form of my invention, it will be understood that slight changes might be made in the form and arrangement of the several parts without departing from the spirit and scope of my invention, and hence I do not wish to be limited thereto except for such limitations as the claims may import.

I claim:—

1. A gate structure comprising a gate post, straps mounted on said gate post, a jamb member mounted in said straps to be capable of vertical movement, a gate, swung on said jamb member, an operating lever pivoted on said gate post, and a link connected between said operating lever and said jamb in such relation that swinging movement transmitted to the operating lever causes the jamb member and the gate swung thereon to be raised and lowered with respect to the ground.

2. A gate structure comprising a gate post, a main gate member movably associated with said gate post, a supplemental gate member mounted to slide longitudinally with respect to said main gate member, an operating lever pivotally mounted intermediate its ends on said main gate member, a rocking lever pivotally mounted intermediate its ends on said main gate member, a link loosely connecting one end of said operating lever and one end of said rocking lever, a second link loosely connecting the other end of said rocking lever and said supplemental gate member whereby movement of said operating lever will cause longitudinal movement of said supplemental gate member, as and for the purpose specified.

In testimony whereof I affix my signature in presence of two witnesses.

HENRY Z. FLETCHER.

Witnesses:
BENJ. C. HOOPER,
MABEL HARRIS.

Copies of this patent may be obtained for five cents each, by addressing the "Commissioner of Patents, Washington, D. C."